US010131578B2

(12) United States Patent
Gaedt et al.

(10) Patent No.: US 10,131,578 B2
(45) Date of Patent: Nov. 20, 2018

(54) POLYMERIC DISPERSANT

(71) Applicant: BASF SE, Ludwigshafen (DE)

(72) Inventors: Torben Gaedt, Traunstein (DE);
Martin Winklbauer, Halsbach (DE);
Harald Grassl, Feichten (DE); Michael Schinabeck, Altenmarkt (DE); Nina Susanne Hillesheim, Nidda (DE);
Antonia Grafetstetter, Trostberg (DE)

(73) Assignee: BASF SE, Ludwigshafen (DE)

( * ) Notice: Subject to any disclaimer, the term of this patent is extended or adjusted under 35 U.S.C. 154(b) by 38 days.

(21) Appl. No.: 14/897,778

(22) PCT Filed: Jul. 10, 2014

(86) PCT No.: PCT/EP2014/064779
§ 371 (c)(1),
(2) Date: Dec. 11, 2015

(87) PCT Pub. No.: WO2015/004219
PCT Pub. Date: Jan. 15, 2015

(65) Prior Publication Data
US 2016/0122243 A1 May 5, 2016

(30) Foreign Application Priority Data
Jul. 12, 2013 (EP) .................................... 13176235

(51) Int. Cl.
| C04B 11/00 | (2006.01) |
| C04B 16/04 | (2006.01) |
| C04B 24/24 | (2006.01) |
| C04B 28/14 | (2006.01) |
| C08F 220/28 | (2006.01) |
| C04B 103/40 | (2006.01) |
| C04B 111/00 | (2006.01) |
| C04B 111/62 | (2006.01) |

(52) U.S. Cl.
CPC .............. *C04B 11/00* (2013.01); *C04B 16/04* (2013.01); *C04B 24/246* (2013.01); *C04B 28/14* (2013.01); *C08F 220/28* (2013.01); *C04B 2103/408* (2013.01); *C04B 2111/0062* (2013.01); *C04B 2111/62* (2013.01)

(58) Field of Classification Search
CPC ....... C04B 11/00; C04B 16/04; C04B 24/246; C04B 28/14; C04B 2103/408; C04B 2111/0062; C04B 2111/62; C08F 220/28; C08F 220/286; C08F 230/02; C08F 2220/286

USPC ............................................... 524/3; 526/278
See application file for complete search history.

(56) References Cited

U.S. PATENT DOCUMENTS

| 3,855,364 | A | 12/1974 | Steckler |
| 4,009,062 | A | 2/1977 | Long |
| 7,964,682 | B2 | 6/2011 | Shimoda et al. |
| 8,058,377 | B1 | 11/2011 | Goc-Maciejewska et al. |
| 8,143,332 | B2 | 3/2012 | Shimoda et al. |
| 8,536,251 | B2 | 9/2013 | Flakus et al. |
| 8,962,713 | B2 | 2/2015 | Faure et al. |
| 2006/0293417 | A1 | 12/2006 | Taniguchi et al. |
| 2008/0035022 | A1 | 2/2008 | Hamada et al. |
| 2008/0146700 | A1* | 6/2008 | Kraus ................ C08F 212/14 524/3 |
| 2009/0076243 | A1* | 3/2009 | Kubo ................... C07F 9/091 528/398 |

FOREIGN PATENT DOCUMENTS

| EP | 1 743 877 A1 | 1/2007 | |
| EP | 1 767 504 A1 | 3/2007 | |
| EP | 1 923 409 A1 | 5/2008 | |
| EP | 1 972 643 A1 | 9/2008 | |
| EP | 1 975 136 A1 | 10/2008 | |
| JP | 2000-327386 A | 11/2000 | |
| JP | 2007153637 A * | 6/2007 | ........... C04B 24/246 |
| WO | 2010/0076093 A1 | 8/2010 | |
| WO | 2010/109335 A1 | 9/2010 | |

OTHER PUBLICATIONS

JP 2007-153637 A (2007), machine translation, JPO Platform for Patent Information (J-PlatPat).*

* cited by examiner

*Primary Examiner* — Josephine L Chang
(74) *Attorney, Agent, or Firm* — Oblon, McClelland, Maier & Neustadt, L.L.P.

(57) ABSTRACT

The invention relates to a dispersant comprising a polymer obtainable by copolymerization of monomers including 5 to 80 mol % of a hydroxyalkyl acrylate phosphate and/or hydroxyalkylacrylamide phosphate (monomer 1), 0 to 20 mol % of a di(hydroxyalkyl acrylate) phosphate and/or di(hydroxyalkylacrylamide) phosphate (monomer 2) and 1 to 80 mol % of a polyalkylene glycol-containing macromonomer comprising an alkene group (monomer 3). Further disclosed is a process for preparing the polymers of the invention and the use thereof as dispersants in calcium sulphate-containing compositions. A further aspect of the invention is a process for producing shaped gypsum bodies, and also shaped gypsum bodies, more particularly gypsum plasterboards and self-levelling screeds, comprising the dispersant of the invention.

14 Claims, No Drawings

POLYMERIC DISPERSANT

This application is a § 371 of International Application No. PCT/EP2014/064779 filed Jul. 10, 2014, and claims priority from European Patent Application No. 13176235.3 filed Jul. 12, 2013.

The invention relates to a dispersant based on a polymer which is obtainable by copolymerization of specific monomers.

In order to endow inorganic solids suspensions with improved workability, i.e. kneadability, spreadability, sprayability, pumpability or flowability, it is common to add to them admixtures in the form of dispersants or plasticizers. Inorganic solids of this kind in the construction industry normally comprise inorganic binders such as, for example, cement based on Portland cement (EN 197), cement with particular properties (DIN 1164), white cement, calcium aluminate cement or high-alumina cement (EN 14647), calcium sulphoaluminate cement, speciality cements, calcium sulphate n-hydrate (n=0 to 2), lime or building-lime (EN 459), and also pozzolans and latent hydraulic binders such as, for example, flyash, metakaolin, silica dust and slag sand. The inorganic solids suspensions further generally include fillers, more particularly aggregate consisting, for example, of calcium carbonate, quartz or other natural minerals in various grain sizes and grain shapes, and also further inorganic and/or organic additives (admixtures) for the targeted influencing of properties of chemical products used in construction, such as hydration kinetics, rheology or air content, for example. Additionally present may be organic binders such as latex powders, for example.

In order to convert building material mixtures, based more particularly on inorganic binders, into a workable, ready-to-use form, the amount of mixing water required is generally substantially more than would be necessary for the subsequent hydration or hardening process. The void fraction in the construction element that is formed by the excess water, which later evaporates, leads to significantly impaired mechanical strength, stability and durability of adhesion.

In order to reduce this excess water fraction for a specified working consistency and/or to improve the workability in the case of a specified water/binder ratio, admixtures are used which are referred to generally in construction chemistry as water reducers or plasticizers. Known such admixtures include, in particular, polycondensation products based on naphthalene- or alkylnaphthalenesulphonic acids and/or on melamine-formaldehyde resins containing sulphonic acid groups.

The objective of adding dispersants in the construction industry is either to raise the plasticity of the binder system or to reduce the amount of water needed under the same working conditions.

It has emerged that dispersants based on lignosulphonate, melaminesulphonate and polynaphthalenesulphonate are significantly inferior in their activity to the weakly anionic copolymers containing polyalkylene oxide. These copolymers are also referred to as polycarboxylate ethers (PCE). Polycarboxylate ethers disperse the inorganic particles not only via electrostatic charging, owing to the anionic groups (carboxylate groups, sulphonate groups), present on the main chain, but also stabilize the dispersed particles by means of steric effects as a consequence of the polyalkylene oxide side chains, which through absorption of water molecules form a stabilizing protective layer around the particles.

This makes it possible either to reduce the amount of water required to establish a particular consistency, as compared with the conventional dispersants, or else to reduce the plasticity of the wet building-material mixture, through the addition of the polycarboxylate ethers, to an extent such that self-compacting concrete or self-compacting mortars can be produced with low water/cement ratios. The use of the polycarboxylate ethers also allows the production of ready-mixed concrete or ready-mixed mortar, which remains pumpable for prolonged periods, or the production of high-strength concretes or high-strength mortars through the setting of a low water/cement ratio.

In addition to the polycarboxylate ethers described, there have since been disclosed a series of derivatives with modified activity profile as well. Thus, for example, WO2010076093 describes a copolymer comprising i) 3 to 40 mol % of an isoprenol polyether derivative of the structural unit α, ii) 3 to 40 mol % of a polyether-vinyloxy structural unit β, and iii) 35 to 93 mol % of a structural unit γ comprising an acid, where the acid may also be a phosphoric ester, with the structural unit β in the copolymer having longer side chains than the structural unit α.

EP1975136 describes dispersants for hydraulic binders, comprising a polymer which is obtainable by copolymerization of at least four monomer building blocks, each monomer building block comprising an unsaturated radical. These are a monomer comprising a polyoxyalkylene group, a monomer comprising a phosphate monoester, a monomer comprising a phosphate diester and a monomer comprising a carboxylic acid radical.

In the prior art there are a range of further dispersants known, based on copolymers which comprise an unsaturated monomer, comprising a polyalkylene glycol side chain, and also an unsaturated monomer with a phosphate radical. In this respect, mention may be made more particularly of EP1767504, EP1972643, EP1743877, WO2010109335 and U.S. Pat. No. 8,058,377.

It is known, moreover, that comb polymers having polyethylene glycol side chains and carboxylate units along the polymer backbone are very metering-efficient plasticizers for gypsum suspensions. A significant disadvantage of these plasticizers is the not inconsiderable delay in gypsum hydration. This causes considerable problems in the production process of gypsum plasterboard. Thus, for example, a not inconsiderable amount of hydration accelerator in the form of a gypsum suspension must be metered in so as to ensure sufficiently rapid hydration. The metering in particular leads frequently to interruptions to the production of gypsum plasterboard as a result of clogging of the accelerator suspension lines.

From JP 2000-327386 it is known that copolymer dispersants based on unsaturated monomers with a phosphate radical, for example 2-hydroxyethyl methacrylate phosphate (HEMA phosphate), with unsaturated monomers which carry a polyalkylene glycol side chain via a monoether or monoester bond, permit effective plasticization in conjunction with little retardation in hydraulic binders, including, in particular, gypsum-containing suspensions.

However, the problem is still there that the copolymers disclosed are relatively expensive and must be used in relatively large quantities.

The object, therefore, was to provide dispersants, more particularly for gypsum-containing suspensions, that achieve very low retardation in conjunction with high metering efficiency.

This object has been achieved by means of a dispersant comprising a polymer obtainable by copolymerizing monomers comprising
5 to 80 mol %, more particularly 10 to 60 mol %, very preferably 15 to 50 mol % of at least one monomer 1 represented by the formula (1) below,
0 to 20 mol %, more particularly 1 to 15 mol %, very preferably 2 to 10 mol % of at least one monomer 2 represented by the formula (2) below and
1 to 80 mol %, more particularly 5 to 60 mol %, very preferably 10 to 50 mol % of at least one monomer 3 represented by the formula (3) below:

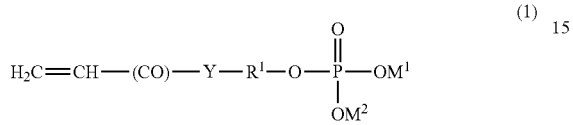

(1)

in which
$R^1$ is an alkylene group having 2 to 8 carbon atoms,
Y is O or $NR^2$,
$R^2$ is a radical from the group of hydrogen, an alkyl group having 1 to 8 carbon atoms, and formula (A), where $R^1$, $M^1$ and $M^2$ possess the definitions stated for formula (1),

(A)

$M^1$ and $M^2$ each independently of one another are hydrogen, an ammonium compound and a mono-, di- or trivalent metal, preferably sodium or hydrogen;

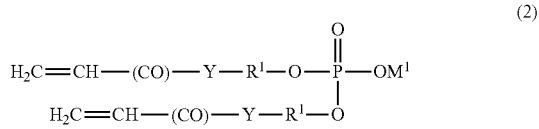

(2)

in which $R^1$, Y and $M^1$ possess the definitions stated for formula (1), $$R^3-O-(C_nH_{2n}O)_m-Z \quad (3)$$

in which
$R^3$ is hydrogen, an aliphatic hydrocarbon radical having 1 to 16 C atoms, a cycloaliphatic radical having 5 to 12 C atoms or an aryl radical having 6 to 14 C atoms, it being possible for the aryl radical to have further substituents,
n is identical or different and in each case is an integer from 2 to 4,
m is an integer between 20 and 160, in particular between 50 and 140,
Z is at least one radical 4, 5, 6 and 7, represented by the formulae (4), (5), (6) and (7) below:

(4)

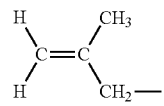

(5)

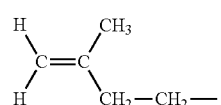

(6)

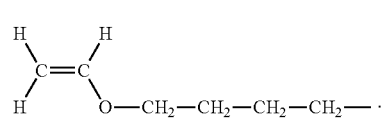

(7)

Surprisingly it has been found that the dispersant of the invention permits very low retardation in conjunction with excellent metering efficiency in gypsum-containing suspensions.

It is further preferred for the group $R^1$ both in monomer 1 and in monomer 2 to be an ethylene group. More particularly monomer 1 may be 2-hydroxyethyl acrylate phosphate, 3-hydroxypropyl acrylate phosphate, 2-hydroxyethylacrylamide phosphate or 3-hydroxypropylacrylamide phosphate. Monomer 2 may preferably be bis[2-hydroxyethyl acrylate] phosphate, bis[3-hydroxypropylacrylate]phosphate, bis[2-hydroxyethylacrylamide]phosphate or bis[3-hydroxypropylacrylamide]phosphate.

Monomer 3 may very preferably be at least one compound from the series of 3-methylbut-3-en-1-ol-polyethylene glycol with a molar mass of 1000 to 3000 g/mol, 3-methylbut-3-en-1-ol-polypropylene glycol with a molar mass of 1000 to 3000 g/mol, methallyl-polyethylene glycol with a molar mass of 1000 to 3000 g/mol, vinyloxybutyl-polyethylene glycol with a molar mass of 1000 to 7000 g/mol, vinyloxybutylpolypropylene glycol with a molar mass of 1000 to 7000 g/mol, allylpolyethylene glycol with a molar mass of 1000 to 3000 g/mol and allylpolypropylene glycol with a molar mass of 1000 to 3000 g/mol.

Besides the monomers 1 to 3 essential to the invention there may in principle also be other monomers present in the polymer of the invention. Suitable more particularly in this context are all radically polymerizable monomers. The polymer of the invention may comprise, for example, at least one further monomer from the following monomers:
  arylalkenes and heteroarylalkenes, optionally substituted, such as e.g.: styrene, alpha-methylstyrene, vinylpyridine, 4-vinylphenylsulphonic acid, 4-vinylbenzoic acid, 4-vinylphthalic acid and salts thereof
  allyl and methallyl compounds such as e.g.: allyl alcohol, allylsulphonic acid, methallyl alcohol, methallylsulphonic acid, 3-allyloxy-1,2-propanediol, 3-allyloxy-1,2-propanediol (polyalkoxyl)ethers, 3-methallyloxy-1,2-propanediol, 3-methallyloxy-1,2-propanediol (polyalkoxyl)ethers, isoprenol, isoprenol alkyl ethers
  vinyl ethers such as e.g. 1-butyl vinyl ether, isobutyl vinyl ether, aminopropyl vinyl ether, ethylene glycol monovinyl ether, 4-hydroxybutyl monovinyl ether, vinylether alkoxylates,
  vinyl esters such as e.g. vinyl acetate, vinyl carbamate
  vinylic aldehydes and ketones such as e.g. acrolein, methacrolein, vinyl-1,3-dioxolane, crotonaldehyde, 3-oxo-1-butene
  acrylic acid and methacrylic acid, their salts and their esters such as e.g. 2-hydroxyethyl acrylate, 2-hydroxyethyl methacrylate, 2-hydroxypropyl acrylate, 2-hydroxypropyl methacrylate, methyl methacrylate, ethyl methacrylate, methyl acrylate, (methyl)-polyoxyalkyl acrylates, (methyl)-polyoxyalkyl methacrylates, 2,3-hydroxypropyl (meth)acrylate acrylamides and methacrylamides, optionally substituted, such as acrylamide, methacrylamide, N,N-dimethylacrylamide, N-isopropylacrylamide, N-methacryloylglycinamide, acryloyloxyethyltrimethylammonium chloride acrylonitrile and methacrylonitrile unsaturated polycarboxylic acids and their derivatives such as e.g.: maleic acid, maleic anhydride, maleic monoesters and diesters such as e.g.: dimethyl maleate, monomethyl maleate, diethyl maleate, ethyl maleate, dibutyl maleate, poly(oxyalkylene monomethyl ether) monomaleate, poly(oxyalkylene monomethyl ether) dimaleate, (phosphonooxyalkylene)monomaleate, (phosphonooxyalkylene) dimaleate, maleimides such as maleic sulphanilamide, poly(oxyalkylene monomethyl ether)maleamide, poly(oxyalkylene) maleamide, (phosphonooxyalkylene)maleic monoamide, (phosphonooxyalkylene)maleic diamide, maleic monoanilide, maleimides such as e.g. maleinimide, N-ethylmaleinimide, itaconic acid and itaconic anhydride, itaconic mono(di)esters such as e.g.: dimethyl itaconate, monomethyl itaconate, diethyl itaconate, monoethyl itaconate, monopoly(oxyalkylene monomethyl ether) itaconate, di-poly(oxyalkylene monomethyl ether) itaconate, itaconamide such as e.g.: mono-methyl-polyoxyalkyleneitaconamide, 2,4-hexanedienoic acid vinylic sulphur compounds alkyl vinyl sulphones vinyl sulphones alkenesulphonic acids such as e.g.: 2-acryloylamido-2-methylpropanesulphonic acid, vinylbenzenesulphonic acid, vinylsulphonic acid, 3-sulphopropyl acrylate methacrylic ethylsulphate, [2-(acryloyloxy)ethyl]trimethylammonium methylsulphate N-vinyl amide such as e.g.: 1-vinyl-2-pyrrolidone, 1-vinyl-2-piperidine, 1-vinyl-2-caprolactam, 5-vinylcarbazole, 2-methyl-5-vinylpyridine, N-vinylacetamide, N-vinylformamide alkenes and their derivatives: 2-butene-1,4-diol (and also its polyoxyalkylates), 3,4-dihydroxy-1-butene (and also its polyoxyalkylates), dimethylvinylcarbinol (and also its polyoxyalkylates), prenol (and also its polyoxyalkylates), 3-methyl-3-buten-2-ol (and also its polyoxyalkylates)

In the case of all monomers with anionic groups, their salts from the group of the divalent and trivalent metals, and also ammonium compounds, are also suitable.

The dispersant of the invention comprises more particularly between 1 and 39 mol %, more preferably between 2 and 25 mol %, of at least one further monomer from the series of methallylsulphonate, 2-acryloamido-2-methylpropanesulphonic acid, vinylbenzenesulphonic acid, maleic acid, poly(oxyalkylene monomethyl ether)monomaleate, acrylic acid, methacrylic acid, and vinyl acetate.

In one particularly preferred embodiment the polymer of the invention consists of monomer 1, optionally monomer 2, and monomer 3.

The polymer of the invention preferably has an average molecular weight of between 15,000 and 60,000 g/mol, especially preferably 20,000 to 45,000 g/mol and very preferably 20,000 to 30,000 g/mol, the molecular weight being measured by gel permeation chromatography against a PEG standard.

The dispersant of the invention may be present in the form of an aqueous solution of the polymer of the invention. The dispersant of the invention comprises preferably
(i) 1 to 70 wt % of the polymer of the invention comprising monomer 1, optionally monomer 2, and monomer 3, and
(ii) 30 to 99 wt % of water.

A fraction of the polymer of the invention of 10 to 50 wt %, based on the dispersant of the invention, has proven particularly preferable.

The dispersant of the invention may alternatively be present in the solid aggregate state. By solid aggregate state is meant in the sense of the invention, in particular, powders, flakes, pellets, granules or plates, which in this form can be transported and stored easily.

A further aspect of the present invention is a process comprising the copolymerization of at least one monomer 1 according to claim 1, represented by the formula (1), optionally at least one monomer 2 according to claim 1, represented by the formula (2), and at least one monomer 3 according to claim 1, represented by the formula (3), where the polymerization is carried out in aqueous solution. Preferably the temperature of the reaction solution is set between 5 and 100° C. and the pH between 0.5 and 8.

In an alternative embodiment the process of the invention is carried out in the absence of solvent.

A particularly suitable solvent when preparing the copolymers of the invention is water. It is, though, also possible to use a mixture of water and an organic solvent, in which case the solvent should be very substantially inert in its behaviour with respect to radical polymerization reactions.

The polymerization reaction may take place both under atmospheric pressure and under elevated or reduced pressure. The polymerization may optionally also be performed in an inert gas atmosphere, preferably under nitrogen.

To initiate the polymerization it is possible to use high-energy electromagnetic radiation, mechanical energy, electrical energy or chemical polymerization initiators such as organic peroxides, examples being benzoyl peroxide, tert-butyl hydroperoxide, methyl ethyl ketone peroxide, cumoyl peroxide, dilauroyl peroxide, or azo initiators, examples being azodiisobutyronitrile, azobisamidopropyl hydrochloride and 2,2'-azobis(2-methylbutyronitrile). Likewise suitable are inorganic peroxy compounds, such as ammonium peroxodisulphate, potassium peroxodisulphate or hydrogen peroxide, optionally in combination with reducing agents (e.g. sodium hydrogensulphite, ascorbic acid, sodium dithionite, sulphinic acid, iron(II) sulphate) or redox systems.

Particular preference is given to a mixture of at least one sulphinic acid with at least one iron(II) salt and/or for a mixture of ascorbic acid with at least one iron(II) salt.

Chain transfer agents, used to regulate the molecular weight, are the customary compounds. Suitable known chain transfer agents are, for example, alcohols, such as methanol, ethanol, propanol, isopropanol, n-butanol, sec-butanol and amyl alcohols, aldehydes, ketones, alkylthiols, such as dodecylthiol and tert-dodecylthiol, thioglycolic acid, isooctyl thioglycolate, 2-mercaptoethanol, 2-mercaptopropionic acid, 3-mercaptopropionic acid and certain halogen compounds, such as carbon tetrachloride, chloroform and methylene chloride, for example.

The invention further relates to the use of the dispersant of the invention for inorganic binder systems. Based on the polymer fraction of the dispersants of the invention, they are used preferably in an amount of 0.01 to 10 wt %, based on the weight of the mineral binder, in order to produce the desired effect in the inorganic binder systems.

The binders may more particularly be hydraulic binders and/or latent hydraulic binders. A further aspect of the present invention is the use of the dispersant of the invention in calcium sulphate based binder systems. As already maintained, the dispersants of the invention can be employed with particular advantage in these systems since they enable a very low level of retardation to be achieved on setting, in conjunction with high metering efficiency.

The binder based on calcium sulphate may be present in different hydrate states. Preferred binders of the invention are α-calcium sulphate hemihydrate, β-calcium sulphate hemihydrate, and the anhydrite, which is free from water of crystallization, or mixtures of the stated binders. Particularly preferred is β-calcium sulphate hemihydrate, and especially preferred is β-calcium sulphate hemihydrate containing anhydrite, more particularly anhydrite III. It is also possible for anhydrite dust (finely ground anhydrite) to be employed, this being relatively slow to react and producing only partial setting.

The mixture comprising mineral binder contains preferably at least 30 wt %, especially preferably at least 50 wt %, most preferably at least 70 wt % of calcium sulphate based binder, more particularly calcium sulphate 3-hemihydrate, based on the total weight of the mineral binder. The mineral binder may include other mineral binders, examples being hydraulically setting substances, such as cement, more particularly Portland cements or fused-alumina cements, and their mixtures, respectively, with flyash, silica dust, slags, slag sands and limestone or burnt lime. The mixture may further comprise other additions, such as fibres, for example, and also constituents customary as additives, such as other dispersants, for example, examples being lignosulphonates, sulphonated naphthalene-formaldehyde condensates, sulphonated melamine-formaldehyde condensates or polycarboxylate ethers (PCE), accelerators, retardants, starch, sugars, silicones, shrinkage reducers, defoamers or foam formers.

In a further aspect, the present invention relates to the use of a dispersant of the invention for producing shaped gypsum bodies. The term "shaped body" refers to any cured article which has a three-dimensional extent. The curing of the shaped body is accomplished by drying in an oven or in the air. The shaped body of the invention may be a movable object, such as a gypsum board or a sculpture, for example. Alternatively the shaped body of the invention may be a filling or coating, for example a gypsum render, a floor covering or screed, or any product which is formed on the spreading and curing of the filling compound, for example the filling of a cavity or of a joint.

Envisaged with particular preference for the present invention are shaped gypsum bodies in the form of a gypsum plasterboard comprising the dispersant of the invention. Further embraced is a process for producing gypsum plasterboard using a dispersant of the invention. Of critical importance in the production of gypsum construction board, more particularly gypsum plasterboard, is the speed of the setting process. At present worldwide on an annual basis there are more than 8000 million $m^2$ of gypsum plasterboard produced. The production of gypsum plasterboard is long-established. It is described, for example, in U.S. Pat. No. 4,009,062. The settable gypsum slurry used, composed of calcium sulphate hemihydrate and water, is typically produced in a flow mixer revolving at high speed, applied continuously to a cardboard web and covered with a second piece of cardboard. The two cardboard webs are referred to as the front and backboards. The line of boards then moves along what is called a setting belt, and at the end of the setting belt almost complete conversion of the settable calcium sulphate phases to form calcium sulphate dihydrate must have taken place. After this hardening, the web is singularized into boards, and the water still present in the boards is removed in heated multi-stage dryers.

Gypsum plasterboard of this kind is used to a large extent in interior outfitting for ceilings and walls.

In order to meet the rising demand and also to minimize production costs, efforts are continually being made to improve the production process. Modern plants for the fabrication of gypsum construction boards can reach manufacturing speeds of up to 180 meters per minute. The greatest possible utilization of the plant capacity is possible only with the use of highly efficient accelerators. The setting time of the calcium sulphate hemihydrate here determines the time until the gypsum plasterboard can be cut, and hence the length and the speed of the conveyor belt, and thus the production rate. Furthermore, hydration must be complete before the boards are exposed to high temperatures in the dryer. Otherwise, the strength potential of the binder is not sufficiently utilized, and the risk arises of volume expansion as a result of post-hydration on ingress of moisture.

There is therefore a considerable economic interest in minimizing the retardation in the setting process through the use of dispersant. The present invention accordingly also embraces a process for producing a gypsum plasterboard that uses the dispersant of the invention. The use of the binder of the invention may take place here in the same way as with the dispersants known to date, and so no further changes to the production operation are necessary.

In a further-preferred embodiment, the shaped gypsum body of the invention may be a calcium sulphate-containing self-levelling screed. Further embraced is a process for producing calcium sulphate-containing self-levelling screed that uses a dispersant of the invention.

The examples which follow illustrate the advantages of the present invention.

EXAMPLES

Gel Permeation Chromatography (GPC)

Sample preparation for the determination of molar weight was carried out by dissolving copolymer solution in the GPC eluent, to give a polymer concentration in the GPC eluent of 0.5 wt %. This solution was then filtered through a syringe filter with a polyethersulphone membrane and pore size of 0.45 μm. The injection volume of this filtrate was 50-100 μl.

The average molecular weights were determined by GPC apparatus from Waters, with the model name Alliance 2690, with a UV detector (Waters 2487) and an RI detector (Waters 2410).

Columns: Shodex SB-G Guard Column for SB-800 HQ series
Shodex OHpak SB 804HQ and 802.5HQ
(PHM gel, 8×300 mm, pH 4.0 to 7.5)
Eluent: 0.05 M aqueous ammonium formate/methanol mixture=80:20 (parts by volume)
Flow rate: 0.5 ml/min
Temperature: 50° C.
Injection: 50 to 100 μl
Detection: RI and UV The molecular weights of the copolymers were determined relatively to polyethylene glycol standards from the company PSS Polymer Standards Service GmbH. The molecular weight distribution curves of the polyethylene glycol standards were determined by means of light scattering. The masses of the polyethylene glycol standards were 682,000, 164,000, 114,000, 57,100, 40,000, 26,100, 22,100, 12,300, 6240, 3120, 2010, 970, 430, 194 and 106 g/mol.

Synthesis of 2-Hydroxyethyl Acrylate Phosphate (HEA-P) and 2-Hydroxyethylacrylamide Phosphate (HEAA-P)

A glass reactor is charged with 116 g of 2-hydroxyethyl acrylate, 80 g of polyphosphoric acid are added, and these components are reacted at 40° C. After a reaction time of 2 hours with stirring, the mixture is left to stand at room temperature for a further 24 hours. In the case of the phosphorylation of 2-hydroxyethylacrylamide, an analogous procedure is followed, and the ingredients are reacted in the same molar proportions.

Synthesis of the Inventive Dispersants

Example 1

A glass reactor equipped with stirrer, pH electrode, thermometer, redox electrode and N2 portal is charged with 108.7 g of deionized water and 112.5 g of vinyloxybutylpolyethylene glycol 5800 (VOBPEG 5800) and cooled to a polymerization starting temperature of 15° C. (initial charge).

In a separate feed vessel, 22.12 g of 2-hydroxyethyl acrylate phosphate (HEA-P) are mixed homogeneously with 199.08 g of deionized water and 9.7 g of 50% strength NaOH (solution A). In parallel a 6% strength solution of a mixture of sodium sulphite, the disodium salt of 2-hydroxy-2-sulphinatoacetic acid and the disodium salt of 2-hydroxy-2-sulphonatoacetic acid (Bruggolit FF6 from Brüggemann GmbH) in water is prepared (solution B). With stirring and cooling, first 109.53 g of solution A are added to the initial charge, and then 0.77 g of 3-mercaptopropionic acid (MPA) is added to the rest of solution A. Thereafter, in succession, 0.14 g of 3-mercaptopropionic acid and 0.089 g of ironII sulphate heptahydrate ($FeSO_4$) are introduced into the initial charge solution. This solution is subsequently adjusted with NaOH (50% strength) to a starting pH of 5.3.

With the addition of 0.75 g of hydrogen peroxide (30% strength solution in water) to the initial charge mixture, the reaction is started. At the same time the addition of solution A and solution B to the stirred initial charge is commenced. Solution A is added over 30 minutes. Solution B is added in parallel with a constant metering rate of 13.5 ml/h until peroxide can no longer be detected in the solution. The polymer solution obtained is then adjusted with 50% strength sodium hydroxide solution to a pH of 6.5.

The resulting copolymer is obtained in a solution which has a solids content of 29.3 wt %. The weight-average molar mass of the copolymer is 40,400 g/mol, the polydispersity 1.6.

TABLE 1

Amounts used for the synthesis of the inventive dispersants

| | Initial charge | |
|---|---|---|
| Example | VOBPEG [g] | H₂O deionized [g] |
| 1 | 112.5 | 108.7 |
| 2 | 112.5 | 108.7 |
| 3 | 112.5 | 108.7 |
| 4 | 97.0 | 93.8 |
| 5 | 90.0 | 87.0 |
| 6 | 112.5 | 108.7 |

| | Solution A | | | | Initial fraction | MPA | | | |
|---|---|---|---|---|---|---|---|---|---|
| Example | HEA-P [g] | HEAA-P [g] | H₂O [g] | NaOH (50% strength) [g] | monomer solution [ml] | (to solution A) | FeSO₄ | H₂O₂ | MPA |
| 1 | 22.12 | | 199.1 | 9.7 | 109.53 | 0.70 | 0.089 | 0.75 | 0.08 |
| 2 | 22.12 | | 199.1 | 9.7 | 109.53 | 0.77 | 0.089 | 0.75 | 0.14 |
| 3 | 22.12 | | 199.1 | 9.7 | 109.53 | 0.88 | 0.089 | 0.75 | 0.22 |
| 4 | 22.13 | | 199.1 | 11.2 | 65.70 | 0.37 | 0.223 | 1.88 | 0.08 |
| 5 | 20.53 | | 184.8 | 10.4 | 101.65 | 0.48 | 0.138 | 1.16 | 0.07 |
| 6 | | 18.92 | 170.3 | 6.1 | 18.50 | 0.88 | 0.133 | 1.13 | 0.14 |

[g] = grams
[ml] = millilitres
HEAA-P = 2-hydroxyethylacrylamide phosphate
MPA = 3-mercaptopropionic acid

TABLE 2

Overview of the analytical data

| Example | Mw g/mol | PD |
|---|---|---|
| 1 | 40,400 | 1.6 |
| 2 | 26,900 | 1.3 |

TABLE 2-continued

Overview of the analytical data

| Example | Mw g/mol | PD |
|---|---|---|
| 3 | 26,300 | 1.2 |
| 4 | 22,300 | 1.4 |
| 5 | 25,600 | 1.4 |
| 6 | 32,800 | 1.3 |

Example 7

The experimental apparatus consists of a 500 ml double-walled reactor, thermostat, stirring motor with paddle stirrer, temperature and pH probe, and three feed vessels. The reactor is charged with 60 g of water and 73.72 g of 3-methylbut-3-en-1-ol-polyethylene glycol 2200. The contents of the reactor are heated to 55° C. with stirring, and the temperature is maintained.

Then feed A, consisting of 100 g of water, 39.82 g of 2-hydroxyethyl acrylate phosphate (HEA-P) and 0.30 g of 2-mercaptoethanol, is metered over 2 hours, and feed B, consisting of 23 g of water and 2 g of Wako VA-044 (2,2'-azobis[2-(2-imidazolin-2-yl)propane]dihydrochloride), is metered in over 2 hours and 30 minutes. During the metering of feeds A and B, the pH of the reactor contents is adjusted using feed C, consisting of 9.8 g of sodium hydroxide and 39.2 g of water. The rate at which feed C is metered in is selected such that the pH of the reactor contents is 4.5.

After the end of metering, the reactor contents are stirred at 55° C. for 30 minutes more. Thereafter the reactor contents are cooled to 25° C. and neutralized with a pH of 6. The resulting, colourless, slightly cloudy product has a solids content of 36%. The average molar mass of the polymer is 29,000 g/mol.

Example 8

The experimental apparatus consists of a 500 ml double-walled reactor, thermostat, stirring motor with paddle stirrer, temperature and pH probe, and three feed vessels. The reactor is charged with 55 g of water and 57 g of methallyl-polyethylene glycol 2200. The contents of the reactor are heated to 60° C. with stirring, and this temperature is maintained. When the temperature has been reached, feed A, consisting of 60 g of water, 30.79 g of 2-hydroxyethyl acrylate phosphate (HEA-P) and 0.30 g of 3-mercaptopropionic acid, is metered over 2 hours, and feed B, consisting of 8.4 g of water and 1.6 g of Wako VA-044 (2,2'-azobis[2-(2-imidazolin-2-yl)propane]dihydrochloride), is metered in over 2 hours. During the metering of feeds A and B, the pH of the reactor contents is adjusted using feed C, consisting of 5.2 g of sodium hydroxide and 20.8 g of water. The rate at which feed C is metered in is selected such that the pH of the reactor contents is 2.5.

After the end of metering, the reactor contents are stirred at 60° C. for 60 minutes more. Thereafter the reactor contents are cooled to 25° C. and neutralized with a pH of 6. The resulting, colourless, slightly cloudy product has a solids content of 39%. The average molar mass of the polymer is 28,800 g/mol.

Example 9

The experimental apparatus consists of a 500 ml double-walled reactor, thermostat, stirring motor with paddle stirrer, temperature and pH probe, and three feed vessels. The reactor is charged with 60 g of water and 81.78 g of 3-methylbut-3-en-1-ol-polyethylene glycol 2200. The contents of the reactor are heated to 55° C. with stirring, and this temperature is maintained.

When the temperature has been reached, feed A, consisting of 100 g of water, 27.61 g of 2-hydroxyethyl acrylate phosphate (HEA-P) and 0.30 g of 2-mercaptoethanol, is metered over 2 hours, and feed B, consisting of 23 g of water and 2 g of Wako VA-044 (2,2'-azobis[2-(2-imidazolin-2-yl)propane]dihydrochloride), is metered in over 2 hours. After the end of metering, the reactor contents are stirred at 55° C. for 60 minutes more. Thereafter the reactor contents are cooled to 25° C. and neutralized with a pH of 6. The resulting, colourless, slightly cloudy product has a solids content of 35%. The average molar mass of the polymer is 24,000 g/mol.

Prior-Art Dispersant

Example 10

The prior-art dispersant based on 2-hydroxyethyl methacrylate phosphate is prepared in analogy to JP-2000-327386 (Taiheiyo Cement Corp).

94 g of methoxypolyethylene glycol methacrylate (MPEGMA with 23 EO units) are introduced as an initial charge. Added thereto are 8.8 g of sodium methallylsulphonate and 180 g of water.

24 g of 2-hydroxyethyl methacrylate phosphate (HEMA-P) are added to the initial charge.

The resulting solution is then adjusted with 30% strength sodium hydroxide solution to a pH of 8.5. When the reaction vessel has been flushed with inert gas, 9 g of ammonium persulphate are added slowing and with stirring. The reaction mixture is subsequently stirred at 60° C. for four hours. The resulting colourless, slightly cloudy product has a solids content of 41.4%. The average molar mass is 32,300 g/mol.

Use Examples

The dispersants from the synthesis examples are investigated for their properties as gypsum plasticizers in a suitable test system.

First, 300 g of β-hemihydrate are prehomogenized with finely ground calcium sulphate dihydrate (gypsum) as accelerator, and scattered into 188 g of water. The dispersant is mixed beforehand into the mixing water. The batch is then left to stand for 15 seconds. Then stirring with the Hobart mixer is commenced at level II (285 revolutions per minute) for a further 15 seconds. After a cylinder (h=10 cm, d=5 cm), has been filled, and lifted off after 60 seconds, the slump is ascertained. The solidification time is determined using the method known as the knife method (according to DIN EN 13279-2).

TABLE 3

Use examples for a water-to-gypsum ratio of 0.63

| Dispersant | SM % | CSA [g] | Slump [cm] | Knife [min:sec] |
|---|---|---|---|---|
| Example 10 | 0.130 | 0.05 | 19.3 | 2:30 |
| Example 1 | 0.055 | 0.030 | 19.4 | 2:15 |
| Example 2 | 0.060 | 0.030 | 19.4 | 2:10 |
| Example 3 | 0.060 | 0.030 | 19.0 | 2:15 |
| Example 4 | 0.058 | 0.035 | 19.1 | 2:15 |
| Example 5 | 0.048 | 0.035 | 19.4 | 2:15 |

TABLE 3-continued

Use examples for a water-to-gypsum ratio of 0.63

| Dispersant | SM % | CSA [g] | Slump [cm] | Knife [min:sec] |
|---|---|---|---|---|
| Example 6 | 0.100 | 0.040 | 20.1 | 2:20 |
| Example 7 | 0.045 | 0.035 | 19.4 | 2:20 |
| Example 8 | 0.055 | 0.040 | 19.3 | 2:15 |

SM % = Amount of dispersant (solids) used, based on the amount of β-hemihydrate in percent by mass
CSA = Amount of calcium sulphate dihydrate (gypsum) used as accelerator The dispersants of the invention exhibit a very good plasticizing effect, evident from the low level of dispersant metered in order to achieve the same slump as compared with a methacrylate-based polyphosphate ether according to the prior art (Example 10).

The invention claimed is:

1. A dispersant comprising:
a polymer comprising as copolymerized units:
5 to 80 mol % of at least one monomer 1 of formula (1),

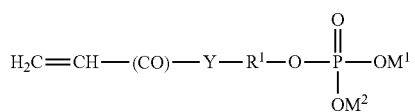

0 to 20 mol % of at least one monomer 2 of formula (2);

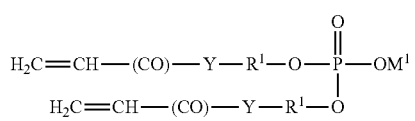

and
1 to 80 mol % of at least one monomer 3 of formula (3):

wherein
$R^1$ is an alkylene group having 2 to 8 carbon atoms;
Y is $NR^2$;
$R^2$ is a radical from the group of hydrogen, an alkyl group having 1 to 8 carbon atoms, and formula (A),

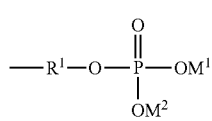

$M^1$ and $M^2$ each independently of one another are hydrogen, an ammonium compound and a mono-, di- or trivalent metal;
$R^3$ is hydrogen, an aliphatic hydrocarbon radical having 1 to 16 C atoms, a cycloaliphatic radical having 5 to 12 C atoms or an aryl radical having 6 to 14 C atoms, the aryl radical optionally having further substituents; n is identical or different and in each case is an integer from 2 to 3; m is an integer between 20 and 160;
Z is at least one radical selected from the group consisting of formulae (4), (5), (6) and (7):

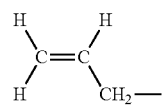

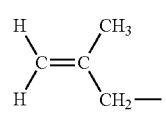

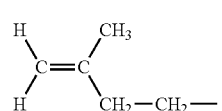

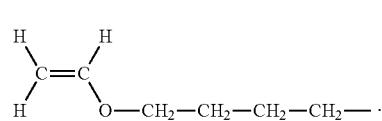

2. The dispersant according to claim 1, wherein the polymer comprises monomer 2.
3. The dispersant according to claim 1, wherein the group $R^1$ in monomer 1 is an ethylene group.
4. The dispersant according to claim 1, wherein the polymer comprises monomer 2 and group $R^1$ in both monomer 1 and monomer 2 is an ethylene group.
5. The dispersant according to claim 1, wherein an average molecular weight of the polymer is between 15,000 and 60,000 g/mol, the molecular weight being measured by gel permeation chromatography against a PEG standard.
6. The dispersant according to claim 1, wherein the polymer consists of copolymerized units of monomer 1 and monomer 3.
7. A process for preparing a polymer according to claim 1, comprising: copolymerizing in an aqueous solution at least one monomer 1 of the formula (1), optionally at least one monomer 2 of the formula (2), and at least one monomer 3 of the formula (3).
8. The process according to claim 7, wherein copolymerizing is at a temperature of is from 5 to 100° C. and a pH of is between 0.5 and 8.
9. A calcium sulphate based binder system comprising a calcium sulphate binder and the dispersant according to claim 1.
10. A shaped gypsum body comprising gypsum and the dispersant according to claim 1.
11. The shaped gypsum body according to claim 10, wherein the shaped gypsum body is a gypsum plasterboard.
12. A process for producing a shaped gypsum body, comprising adding the dispersant according to claim 1 to the aqueous gypsum composition.
13. The process according to claim 12, wherein the shaped gypsum body is a gypsum plasterboard.
14. The process according to claim 12, wherein the shaped gypsum body is a calcium sulphate-containing self-levelling screed.

* * * * *